Nov. 20, 1923.
B. C. SKINNER
1,474,558
DRIVE AND TRIP MECHANISM FOR CONVEYERS
Filed June 14, 1920  3 Sheets-Sheet 1
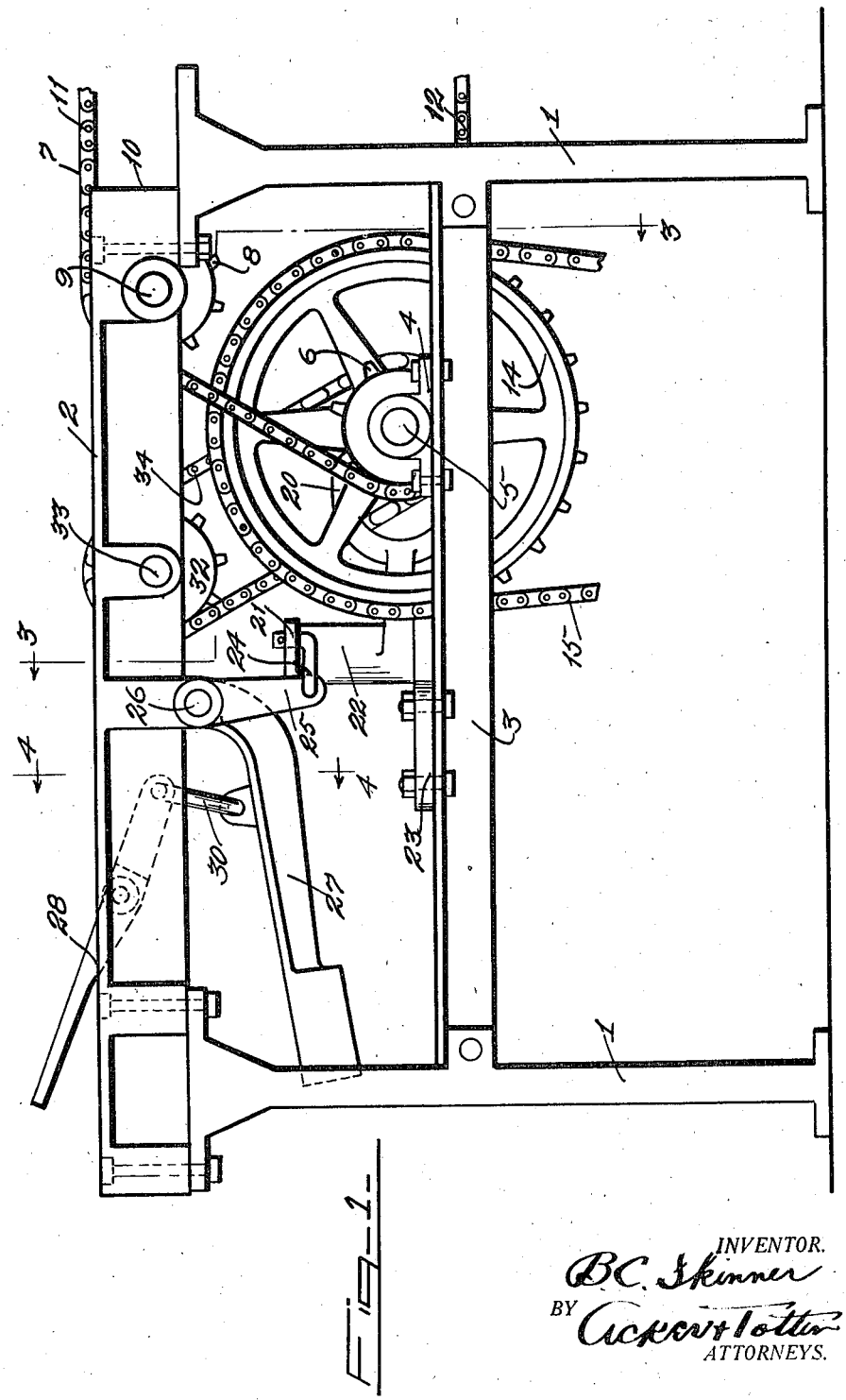

Nov. 20, 1923.
B. C. SKINNER
1,474,558
DRIVE AND TRIP MECHANISM FOR CONVEYERS
Filed June 14, 1920　　3 Sheets-Sheet 2
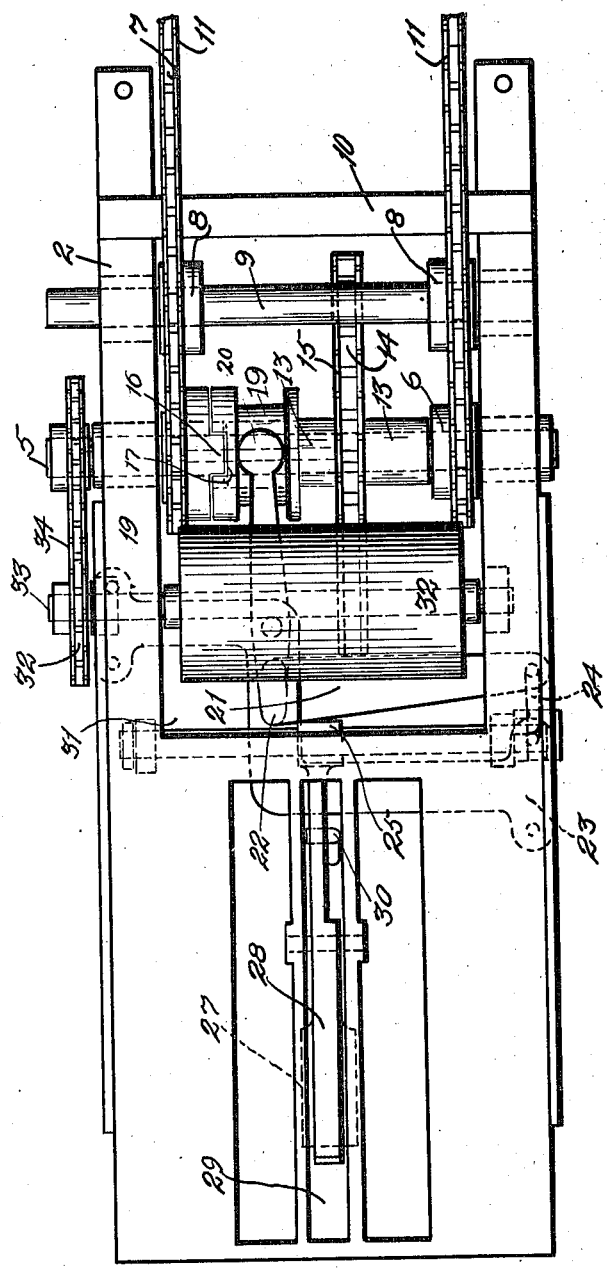
INVENTOR.
B.C. Skinner
BY
ATTORNEYS.

Nov. 20, 1923.

B. C. SKINNER 1,474,558

DRIVE AND TRIP MECHANISM FOR CONVEYERS

Filed June 14, 1920   3 Sheets-Sheet 3

INVENTOR.
B. C. Skinner
BY
ATTORNEYS.

Patented Nov. 20, 1923.

1,474,558

UNITED STATES PATENT OFFICE.

BRONSON C. SKINNER, OF DUNEDIN, FLORIDA, ASSIGNOR TO SKINNER MACHINERY COMPANY, OF DUNEDIN, FLORIDA, A CORPORATION OF FLORIDA.

DRIVE AND TRIP MECHANISM FOR CONVEYERS.

Application filed June 14, 1920. Serial No. 388,927.

*To all whom it may concern:*

Be it known that I, BRONSON C. SKINNER, a citizen of the United States, residing at Dunedin, in the county of Pinellas and State of Florida, have invented certain new and useful Improvements in Drive and Trip Mechanism for Conveyers, of which the following is a specification.

Packing house conveyers, particularly that type designed for use in packing houses associated with the fruit industry, have heretofore been designed and constructed in such manner that the conveyers were generally of the slat type supported at opposite ends by conveyer chains, and in such constructions there have been provided upper and lower flights insuring a conveyer of the endless type. In these mechanisms in order to provide a workable apparatus it has been necessary to locate the drive mechanism and trip clutch exteriorly, preferably at one side of a supporting frame, and owing to the small space or aisles provided between adjacent unit installations of machinery, the lives of the employees have at all times been in jeopardy, owing to their liability of contacting with the drive or clutch mechanism and being seriously injured thereby. When these previous mechanisms have been positioned exteriorly of the frame, greater aisle spaces were required at this particular point in order to permit the easy passage of the employees through the aisles, and also to insure the safety of the employees these mechanisms have been required to be covered or enclosed by expensive casings or coverings.

In the present invention the particular object is to locate or position the clutch and drive mechanism within the limits of the frame, thereby overcoming the liability of the workmen becoming injured through contact with the clutch or drive mechanism, enabling a drive to be constructed whereby the conveyer bars may be eliminated and by the employment of which units may be positioned more closely together at opposite sides of the aisles owing to the elimination of the projecting portions of the drive mechanism beyond the frame sides. A further object is to provide a construction whereby the conveyer may be driven from a point beneath the frame and whereby the conveyer forming chains are driven directly from the driven shaft and at points at opposite sides of the wheel or sprocket to which power is applied for operating the shaft, thus insuring an even strain on the shaft and dispensing with the uneven wearing of the shaft end supporting bearings.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings, wherein—

Fig. 1 is a view in side elevation of the preferred embodiment of my invention, disclosing the trip lever in raised position with the clutch in engaged position.

Fig. 2 is a top plan view of the construction illustrated in Fig. 1.

Figure 4:
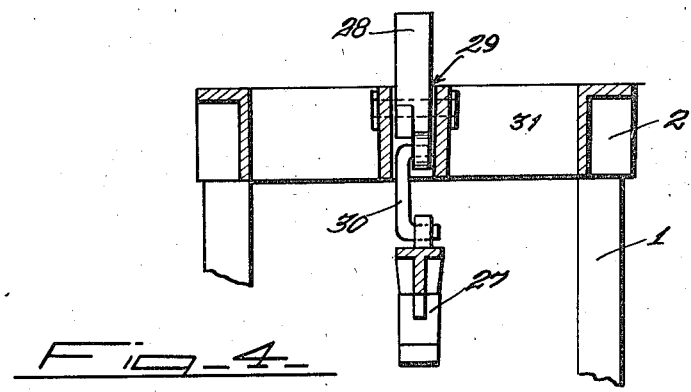
Fig. 4 is a vertical sectional view taken on line 4—4 of Fig. 1.
Figure 3:
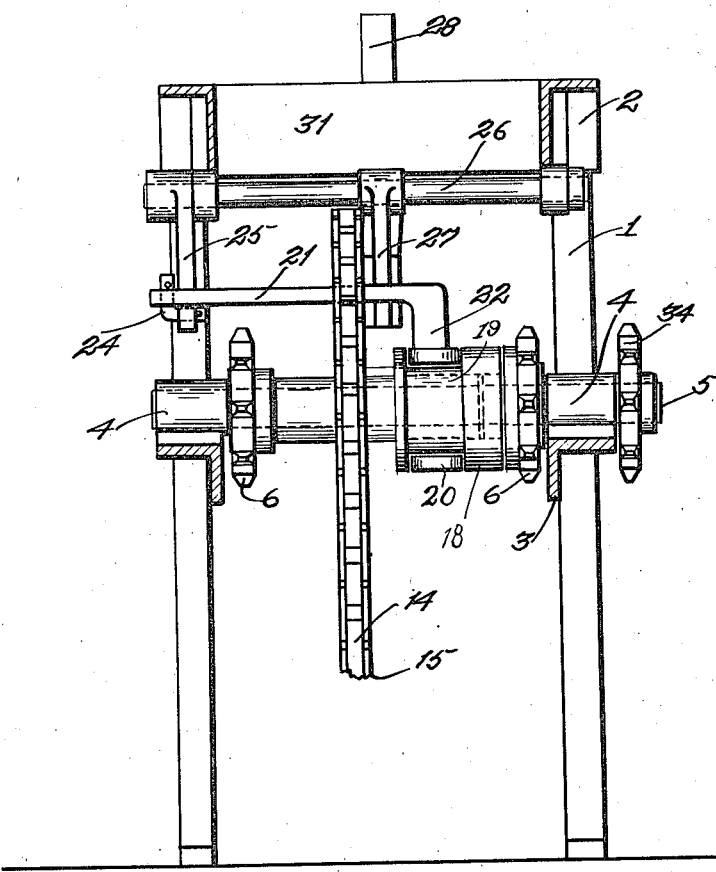
Fig. 3 is a vertical sectional view taken on line 3—3 of Fig. 1.

In the drawings, the numeral 1 indicates the four corner supporting legs of a suitable substantial rectangular frame top 2, the legs being connected by suitable angle members 3. Extending transversely of the frame beneath the top 2 and supported at its ends in bearings 4 carried by the members 3 is a driven shaft 5, to the opposite ends of which, at points within the confines of the side members of the top 2, are keyed the conveyer operating sprockets 6, over each of which passes a suitable flexible member, as, for example, a link chain 7, which forms the receptacle or box conveyer. The chains 7 operate over suitable idlers 8 carried by a shaft 9 disposed transversely beneath the top 2 adjacent its forward edge 10, thus dividing the conveyer into upper and lower flights 11 and 12, the upper flight being horizontally disposed in a plane substantially parallel with the upper surface of the top 2, as in Fig. 1 of the drawings, and the lower flight being disposed preferably parallel with the upper flight at a point in line with the angle members 3, as in Fig. 1 of the drawings.

Mounted for free rotation on the shaft 5 is the hub 13 of a driven sprocket 14 of a diameter considerably larger than the sprockets 6, and said sprocket 14 is adapted to be driven by power transmitted thereto by the flexible member 15, illustrated as a link chain which depends to a point below said bars 3 where it receives its power from a source, not illustrated. This positioning of the sprocket 14 enables the same to be driven from below by power positioned beneath the frame and, if desirable, within the limits of the supporting legs 1.

One face of one of the sprockets 6 is provided with a clutch dog 16 which is adapted for reception within one of a plurality of recesses 17 on one face of a clutch 18 splined to rotate with the hub 13 and capable of longitudinal movement thereon whereby the clutch member is capable of movement into what may be termed driving and inoperative position.

For moving the clutch 18 longitudinally of the hub 13, I prefer to employ the following mechanism which maintains the clutch in inoperative or released position during such time as a receptacle is resting on the trip mechanism, hereinafter described, positioned adjacent the rear end of the top 2. The clutch 18 is annularly grooved on its exterior, as at 19, to receive the forked ends 20 of a bell crank lever 21, fulcrumed as at 22 to a member 23 connecting the angle members 3, and at its free end said member 21 is connected through a link 24 with the free end of a lever 25. The lever 25 depends from the horizontally disposed axially rotatable shaft 26 and said shaft carries a weighted arm 27 disposed adjacent the rear end of the supporting frame, preferably at a point in line with the longitudinal center of the top 2. A trip lever 28 is pivotally mounted within an opening 29 in the rear end of the top 2, Figs. 2 and 4 of the drawings, and the forward end of said lever is adapted to be connected through a link 30 with the weighted arm 27 at a point slightly in rear of its connection with the shaft 26.

It will be apparent that on the depressing of the free end of the trip lever 28 the clutch 18, through its associated operating elements, will be thrown into disengaged position and remains in such position until the weight on the trip lever 28 is removed, thus insuring the constant feed of receptacles to the top 2 by the conveyer 7 at such times as the receptacles are removed from over the trip lever 28.

The portion of the top 2 over the shafts 9 and 5 and for approximately the entire forward end of the top 2 is open or cut away providing an opening 31, as illustrated in Fig. 2 of the drawings.

For transferring the receptacles as fed by the upper conveyer flight 11 onto the forward end of the frame 2 rearwardly on said frame to rest on the rear end thereof and depress the trip lever 28, I provide the following mechanism.

Disposed parallel with the shaft 9 at the rear end of the opening 31, with its peripheral surface approximately flush with the upper surface of the top 2, is a rotatable transfer drum 32 mounted on a shaft 33, which shaft is driven by a flexible connection 34 from the shaft 5.

It will be apparent that the conveyer 7, shaft 9, shaft 5 and drum 32 are only operated at such time as the clutch 18 is in engaged position, which is occasioned by the removal of a receptacle and the consequent release of weight. The receptacles as fed to the forward end 10 of the top 2 pass from the upper flight of the conveyer 11 onto the transfer drum 32, which moves them rearwardly on the top 2 to overlie the upwardly projecting end of the trip lever 28, at which time the clutch mechanism is instantly disengaged and the parts, owing to the weight of the receptacles on the conveyer 11, are brought to an instant stop.

I claim:—

An apparatus for the described purpose comprising a frame having side bars and a top surface, the top surface being formed with an opening at one end, an endless conveyer consisting of spaced flexible members moving onto said frame top surface at one end and passing downwardly through the opening therein, a driven shaft disposed transversely of the apparatus beneath said top and carried by said side bars, sprockets on said shaft within said frame for driving the flexible members and around which the same pass, idler sprockets within said top opening and downwardly over which said flexible members pass, a driven sprocket loose on said shaft intermediate said conveyer sprockets and held from longitudinal movement thereon, a clutch on said shaft for connecting said driven sprocket and shaft to rotate together, a bell crank for operating said clutch, a trip lever projecting above the top of said frame and for actuation by the weight of a receptacle thereon delivered onto the frame top by said conveyers for operating said bell crank to interrupt the connection between said shaft and driven sprocket, a connection between said bell crank and lever, and a transfer roller disposed transversely of the rear end of said top opening in advance of said trip lever and driven from said shaft for transferring receptacles from said flexible members onto the solid portion of said top and onto said trip lever.

In testimony whereof I have signed my name to this specification.

BRONSON C. SKINNER.